United States Patent
Lee

(10) Patent No.: US 12,394,310 B2
(45) Date of Patent: Aug. 19, 2025

(54) AUTONOMOUS DRIVING SYSTEMS AND METHODS FOR AUTONOMOUS VEHICLE DRIVING

(71) Applicants: Hyundai Motor Company, Seoul (KR); Kia Corporation, Seoul (KR)

(72) Inventor: Yeong Ho Lee, Pohang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 197 days.

(21) Appl. No.: 18/197,612

(22) Filed: May 15, 2023

(65) Prior Publication Data

US 2023/0394967 A1 Dec. 7, 2023

(30) Foreign Application Priority Data

Jun. 7, 2022 (KR) .......................... 10-2022-0069001

(51) Int. Cl.
*G08G 1/0967* (2006.01)
*B60W 30/08* (2012.01)
(Continued)

(52) U.S. Cl.
CPC ....... *G08G 1/096725* (2013.01); *B60W 30/08* (2013.01); *B60W 30/18154* (2013.01); *B60W 30/18159* (2020.02); *B60W 60/0025* (2020.02); *B62D 15/0285* (2013.01); *G08G 1/052* (2013.01); *G08G 1/096775* (2013.01); *G08G 1/164* (2013.01); *B60W 2050/009* (2013.01); *B60W 2520/10* (2013.01); *B60W 2552/05* (2020.02); *B60W 2552/53* (2020.02);
(Continued)

(58) Field of Classification Search
CPC ............ G08G 1/096725; G08G 1/052; G08G 1/096775; G08G 1/164; B60W 30/08; B60W 30/18159; B60W 30/18154; B60W 60/0025; B60W 2050/009; B60W 2520/10; B60W 2552/05; B60W 2552/53; B60W 2554/4042; B60W 2556/40; B60W 2556/45; B62D 15/0285
See application file for complete search history.

(56) References Cited

U.S. PATENT DOCUMENTS 9,783,194 B2 * 10/2017 Seo ...................... G05D 1/0297
11,001,254 B2    5/2021 Park
(Continued)

FOREIGN PATENT DOCUMENTS

JP 2019-043509 A 3/2019
JP 2020-049983 A 4/2020
(Continued)

*Primary Examiner* — Dale W Hilgendorf
(74) *Attorney, Agent, or Firm* — MORGAN, LEWIS & BOCKIUS LLP

(57) ABSTRACT

An autonomous driving system includes a server, and a plurality of vehicles configured to communicate with the server. The server is configured to obtain driving information on each of the plurality of vehicles entering an intersection area within a parking lot, generate priority information on each of the plurality of vehicles based on the driving information on each of the plurality of vehicles, and transmit control information including the priority information to each of the plurality of vehicles based on the priority information so that the plurality of vehicles pass through the intersection area.

16 Claims, 13 Drawing Sheets

(51) Int. Cl.
  *B60W 30/18*  (2012.01)
  *B60W 50/00*  (2006.01)
  *B60W 60/00*  (2020.01)
  *B62D 15/02*  (2006.01)
  *G08G 1/052*  (2006.01)
  *G08G 1/16*   (2006.01)

(52) U.S. Cl.
  CPC . *B60W 2554/4042* (2020.02); *B60W 2556/40* (2020.02); *B60W 2556/45* (2020.02)

(56) References Cited

U.S. PATENT DOCUMENTS

| | | | | |
|---|---|---|---|---|
| 11,407,405 | B2* | 8/2022 | Kim | G08G 1/143 |
| 11,749,113 | B2* | 9/2023 | Imazu | G01C 21/3461 |
| | | | | 701/117 |
| 11,763,410 | B1* | 9/2023 | Roy | H04L 9/40 |
| | | | | 701/117 |
| 2017/0008515 | A1* | 1/2017 | Seo | G08G 1/143 |
| 2018/0204450 | A1* | 7/2018 | Song | G08G 1/0145 |
| 2019/0088148 | A1* | 3/2019 | Jacobus | H04L 67/125 |
| 2019/0287400 | A1* | 9/2019 | Cao | G08G 1/142 |
| 2020/0159236 | A1* | 5/2020 | Yoon | G05D 1/0225 |
| 2020/0193813 | A1* | 6/2020 | Sui | G08G 1/0116 |
| 2020/0342760 | A1* | 10/2020 | Vassilovski | G08G 1/161 |
| 2021/0039636 | A1* | 2/2021 | Kamiya | B60W 40/105 |
| 2021/0139017 | A1* | 5/2021 | Sugano | G08G 1/143 |
| 2021/0248906 | A1* | 8/2021 | Wang | G08G 1/07 |
| 2022/0301424 | A1* | 9/2022 | Sakaniwa | G08G 1/056 |
| 2023/0074587 | A1* | 3/2023 | Hidaka | G08G 1/143 |
| 2023/0131851 | A1* | 4/2023 | Yu | G08G 1/163 |
| | | | | 701/301 |
| 2023/0143224 | A1* | 5/2023 | Oh | B60W 40/04 |
| | | | | 701/42 |
| 2024/0378994 | A1* | 11/2024 | Lacaze | G08G 1/0145 |

FOREIGN PATENT DOCUMENTS

| | | |
|---|---|---|
| KR | 10-2005-0078676 A | 8/2005 |
| KR | 10-2017-0070480 A | 6/2017 |
| KR | 10-1758160 B1 | 7/2017 |
| KR | 10-1784132 B1 | 11/2017 |
| KR | 10-2019-0050568 A | 5/2019 |
| KR | 10-2020-0036232 A | 4/2020 |
| KR | 10-2020-0092443 A | 8/2020 |
| KR | 10-2020-0141724 A | 12/2020 |
| KR | 10-2021-0032358 A | 3/2021 |
| KR | 10-2021-0120637 A | 10/2021 |

* cited by examiner

| LICENSE PLATE NUMBER | PRIORITY | ENTRY ORDER | INTERSECTION ENTRY LINE | INTERSECTION EXIT LINE | ENTRY LINE TRANSIT TIME |
|---|---|---|---|---|---|
| V1 | 1 | 1 | L4 | L5 | 4T |

| LICENSE PLATE NUMBER | PRIORITY | ENTRY ORDER | INTERSECTION ENTRY LINE | INTERSECTION EXIT LINE | ENTRY LINE TRANSIT TIME |
|---|---|---|---|---|---|
| V1 | 1 | 1 | L4 | L5 | 4T |
| V2 | - | 2 | L5 | L4 | 2T |

820

| LICENSE PLATE NUMBER | PRIORITY | ENTRY ORDER | INTERSECTION ENTRY LINE | INTERSECTION EXIT LINE | ENTRY LINE TRANSIT TIME |
|---|---|---|---|---|---|
| V1 | 2 | 1 | L4 | L5 | 4T |
| V2 | 1 | 2 | L5 | L4 | 2T |

830

| LICENSE PLATE NUMBER | PRIORITY | ENTRY ORDER | INTERSECTION ENTRY LINE | INTERSECTION EXIT LINE | ENTRY LINE TRANSIT TIME |
|---|---|---|---|---|---|
| V1 | 2 | 1 | L3 | L5 | 4T |
| V2 | 1 | 2 | L5 | L4 | 2T |

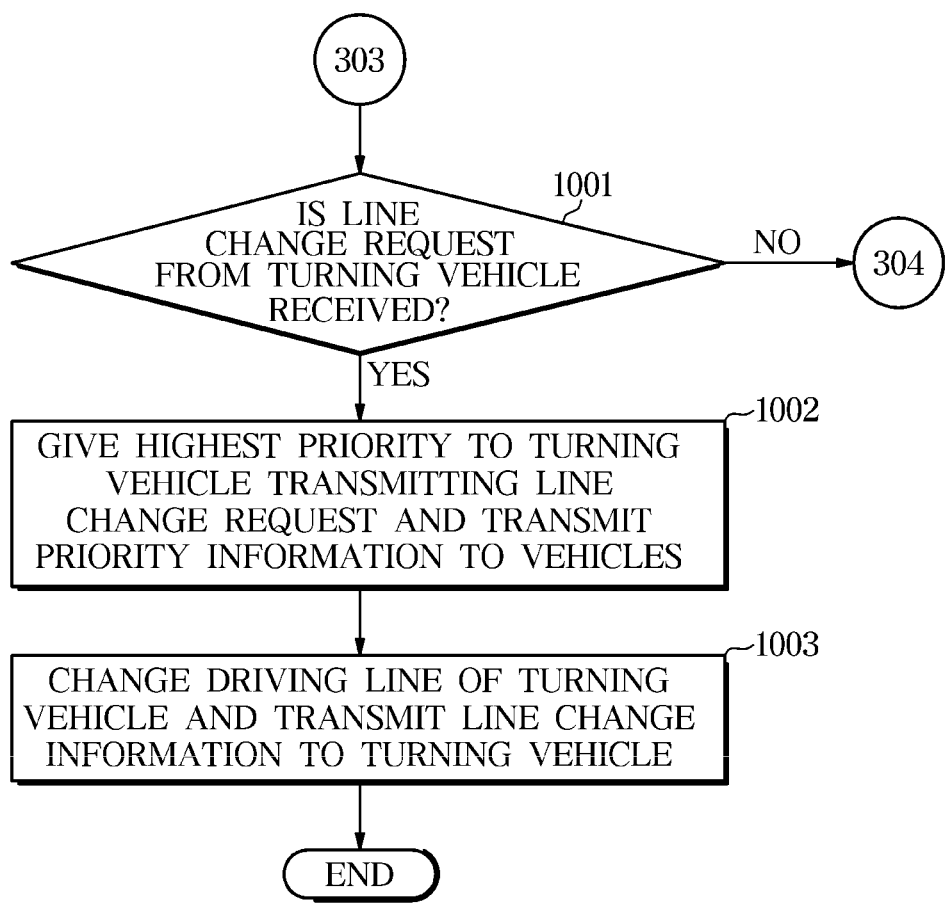

AUTONOMOUS DRIVING SYSTEMS AND METHODS FOR AUTONOMOUS VEHICLE DRIVING

CROSS-REFERENCE TO RELATED APPLICATION

The present application claims priority to Korean Patent Application No. 2022-0069001, filed on Jun. 7, 2022, the entire contents of which is incorporated herein for all purposes by this reference.

BACKGROUND OF THE PRESENT DISCLOSURE

Field of the Present Disclosure

The present disclosure relates to autonomous driving systems and autonomous vehicle driving methods, which efficiently move vehicles without a collision of vehicles at an intersection within a parking lot.

DESCRIPTION OF RELATED ART

Recently developed autonomous vehicles can check a parking space and perform autonomous parking. To perform the autonomous parking, the autonomous vehicle is provided with various sensors such as a camera, an infrared sensor, a radar, a global positioning system (GPS), a Light Detection and Ranging (LiDAR) and/or a gyroscope. Furthermore, there is a technology for performing autonomous parking using a map including information on a parking space in a parking lot.

However, while an autonomous vehicle moves within a parking lot to find a parking space, an accident with another vehicle may occur. For example, when a plurality of vehicles enter an intersection area within the parking lot, movement paths of the plurality of vehicles may overlap. In the instant case, when there is no standard for the plurality of vehicles to pass through the intersection area, there may occur a problem in that a collision between the plurality of vehicles occurs or passage through the intersection area is delayed.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing autonomous driving systems and methods for vehicle autonomous driving, which efficiently move vehicles without a collision of vehicles at an intersection within a parking lot.

Additional aspects of the present disclosure will be set forth in part in the description which follows, and in part, will be obvious from the description, or may be learned by practice of the present disclosure.

In accordance with one aspect of the present disclosure, an autonomous driving system includes a server, and a plurality of vehicles configured to communicate with the server. The server may obtain driving information on each of the plurality of vehicles entering an intersection area within a parking lot, generate priority information on each of the plurality of vehicles based on the driving information on each of the plurality of vehicles, and transmit control information including the priority information to each of the plurality of vehicles based on the priority information so that the plurality of vehicles pass through the intersection area.

The server may transmit a parking lot map, which includes a plurality of nodes and a plurality of node lines formed by the plurality of nodes, to the plurality of vehicles, and obtain the driving information which includes driving line information including intersection entry lines and intersection exit lines, which are selected by the plurality of vehicles from among the plurality of node lines, speed information on each of the plurality of vehicles and entry order information indicating the order of the plurality of vehicles entering the intersection area.

The server may detect dangerous vehicles scheduled to travel in directions facing each other along the same node line, determine a target vehicle for which a change of a driving line is required among the detected dangerous vehicles based on the priority information, change an intersection entry line of the target vehicle for collision avoidance, and transmit line change information including the changed intersection entry line to the target vehicle.

The server may be configured to determine a vehicle having a relatively low priority among the detected dangerous vehicles as the target vehicle.

The server may be configured to predict a transit time required to transit an intersection entry line based on an intersection entry line and the speed information on each of the plurality of vehicles to generate the priority information, and determine a priority of each of the plurality of vehicles based on the transit time and the entry order information.

The server may compare the transit times of the plurality of vehicles, and when the transit times of the plurality of vehicles are different, give a high priority to a vehicle having a shortest transit time among the plurality of vehicles, and when the transit times of the plurality of vehicles are the same, give a higher priority to a vehicle entering the intersection area earlier among the plurality of vehicles.

The server may be configured to generate the plurality of nodes at positions corresponding to corners of each of parking blocks forming the intersection area, generate a plurality of node lines by connecting two among the plurality of nodes with a straight line, and arrange the plurality of node lines in parallel with each other between the parking blocks.

When a collision risk due to the plurality of vehicles is detected, the control information may include avoidance control information for causing a first vehicle having a relatively high priority to avoid other vehicles among the plurality of vehicles, and stop control information for causing a second vehicle having a relatively low priority to stop temporarily among the plurality of vehicles.

The server may give the highest priority to a turning vehicle in response to receiving a line change request from the turning vehicle among the plurality of vehicles, change a driving line of the turning vehicle, and transmit line change information including the changed driving line to the turning vehicle.

The server may identify an interfering vehicle, which is entering or coming out of the parking block, and gives the highest priority to the interfering vehicle.

In accordance with another aspect of the present disclosure, an autonomous vehicle driving method includes obtaining driving information on each of the plurality of vehicles entering an intersection area within a parking lot, generating priority information on each of the plurality of vehicles based on the driving information on each of the plurality of vehicles, and transmitting control information including the priority information to each of the plurality of vehicles based on the priority information so that the plurality of vehicles pass through the intersection area.

The obtaining of the driving information may include transmitting a parking lot map, which includes a plurality of nodes and a plurality of node lines formed by the plurality of nodes, to the plurality of vehicles; obtaining driving line information including intersection entry lines and intersection exit lines, which are selected by the plurality of vehicles from among the plurality of node lines; and obtaining speed information on each of the plurality of vehicles and entry order information indicating the order of the plurality of vehicles entering the intersection area.

The transmitting of the control information may include detecting dangerous vehicles scheduled to travel in directions facing each other along the same node line; determining a target vehicle for which a change of a driving line is required among the detected dangerous vehicles based on the priority information; changing an intersection entry line of the target vehicle for collision avoidance; and transmitting line change information including the changed intersection entry line to the target vehicle.

The target vehicle may be a vehicle, which has a relatively low priority, among the detected dangerous vehicles.

The generating of the priority information may include predicting a transit time required to transit an intersection entry line based on an intersection entry line and the speed information on each of the plurality of vehicles, and determining a priority of each of the plurality of vehicles based on the transit time and the entry order information.

The generating of the priority information may include comparing the transit times of the plurality of vehicles, and when the transit times of the plurality of vehicles are different, giving a high priority to a vehicle having a shortest transit time among the plurality of vehicles, and when the transit times of the plurality of vehicles are the same, giving a higher priority to a vehicle entering the intersection area earlier among the plurality of vehicles.

The plurality of nodes may be generated at positions corresponding to corners of each of parking blocks forming the intersection area, each of the plurality of node lines may be generated by connecting two among the plurality of nodes with a straight line, and the plurality of node lines are disposed in parallel with each other between the parking blocks.

When a collision risk due to the plurality of vehicles is detected, the control information may include avoidance control information for causing a first vehicle having a relatively high priority to avoid other vehicles among the plurality of vehicles, and stop control information for causing a second vehicle having a relatively low priority to stop temporarily among the plurality of vehicles.

The generating of the priority information may include, in response to receiving a line change request from a turning vehicle among the plurality of vehicles, giving the highest priority to the turning vehicle, and the transmitting of the control information may include changing a driving line of the turning vehicle and transmitting line change information including the changed driving line to the turning vehicle.

The generating of the priority information may include identifying an interfering vehicle which is entering or coming out of the parking block, and giving the highest priority to the interfering vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 6 is a diagram illustrating driving information and priority information of the vehicle described in FIG. 5;

FIG. 9 is a diagram illustrating priority information and line change information which are generated to control the plurality of vehicles described in FIG. 8;

FIG. 10 is a flowchart illustrating an operation of a server which receives a line change request from a turning vehicle turning in an intersection area;

Figure 1:
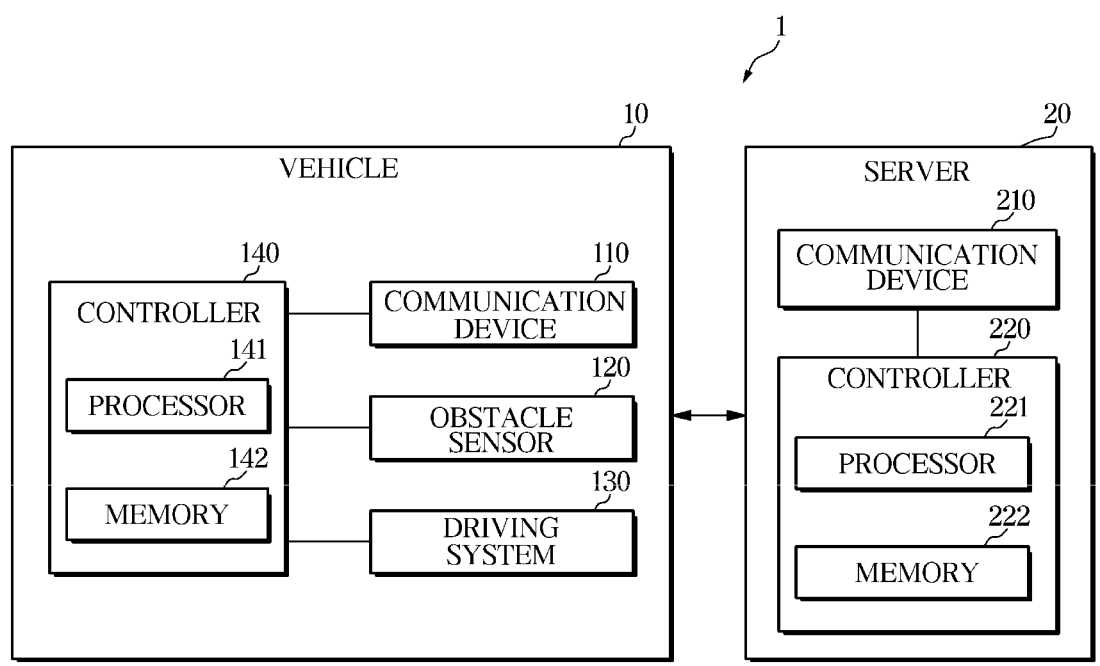
FIG. 1 is a diagram illustrating a configuration of an autonomous driving system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Like reference numerals refer to like components throughout the present specification. The present specification does not describe all components of embodiments, and a common description in the field of the present disclosure to which the present disclosure pertains and an overlapping description between the exemplary embodiments will be omitted.

Throughout the present specification, when a part is referred to as being "connected" to another part, it includes not only a direct connection but also an indirect connection, and the indirect connection includes a connection through a wireless communication network.

Furthermore, when a part is referred to as "including" a component, this means that the part may include another element, not excluding another element unless specifically stated otherwise.

The singular forms include plural forms unless the context clearly notes otherwise.

Furthermore, the terms "~part," "~er," "~block," "~module," and the like may mean a unit of processing at least one function or operation. For example, these terms may mean at least one process which is performed by at least one piece of hardware such as a field-programmable gate array (FPGA) and an application specific integrated circuit (ASIC), at least one piece of software stored in a memory, or a processor.

A reference numeral, which is assigned to each step, is used for discriminating each step and does not describe the order of the steps, and these steps may be differently performed from the described order unless clearly specified in the context.

Hereinafter, embodiments of autonomous driving systems and methods for vehicle autonomous driving will be described in detail with reference to the accompanying drawings.

FIG. 1 is a diagram illustrating a configuration of an autonomous driving system according to an exemplary embodiment of the present disclosure.

Referring to FIG. 1, a disclosed autonomous driving system 1 may include a vehicle 10 and a server 20. The vehicle 10 and the server 20 may communicate with each other. For example, the vehicle 10 and the server 20 may transmit and receive data using wireless communication. When a plurality of vehicles 10 are present, the server 20 may communicate with each of the plurality of vehicles 10.

The wireless communication may include cellular communication using 5th generation (5G), Long Term Evolution (LTE), LTE-advance (LTE-A), Code Division Multiple Access (CDMA), wideband CDMA (WCDMA), a universal mobile telecommunications system (UMTS), Wireless Broadband (WiBro), or a global system for mobile communications (GSM). Furthermore, the wireless communication may include wireless fidelity (WiFi), Bluetooth®, Bluetooth low energy (BLE), Zigbee®, Near Field Communication (NFC), magnetic secure transmission, a radio frequency (RF), or a body area network (BAN). The wireless communications may include global navigation satellite systems (GNSSs). The GNSS may be a global positioning system (GPS), a global navigation satellite system (Glonass), a BeiDou navigation satellite system (hereinafter referred to as "BeiDou"), or Galileo (European global satellite-based navigation system).

The vehicle 10 and the server 20 may transmit and receive data using wired communication. The wired communication may include a universal serial bus (USB), a high definition multimedia interface (HDMI), recommended standard-232 (RS-232), power line communication, or plain old telephone service (POTS).

The vehicle 10 may include a communication device 110, an obstacle sensor 120, a driving system 130, and a controller 140. The communication device 110 may communicate with an external device of the vehicle 10. As described above, the communication device 110 may communicate with the server 20. The communication device 110 may be a communication circuit and/or a communication device to which the above-described communication technologies are applied.

The obstacle sensor 120 may detect obstacles around the vehicle 10. The obstacle sensor 120 may include at least one among a camera, an ultrasonic sensor, a radar, or a Light Detection and Ranging (LiDAR). When an obstacle approaching the vehicle 10 is detected by the obstacle sensor 120 while the vehicle 10 is moving, the vehicle 10 may stop.

The camera included in the obstacle sensor 120 may obtain image data on objects such as other vehicles, pedestrians, cyclists, lanes, road structures, and road signs. The radar included in the obstacle sensor 120 may be provided to emit radio waves to the vicinity of the vehicle 10 and to receive reflected radio waves reflected from objects around the vehicle 10. The radar may be provided at a front side, a rear side, a lateral side, and/or corners of the vehicle 10.

In addition to the above sensors, various sensors may be provided in the vehicle 10. For example, the vehicle 10 may include a speed sensor configured for detecting a speed, a yaw rate sensor configured for detecting a change in angular speed, and a steering sensor configured for detecting a steering angle of a steering device.

The driving system 130 includes various devices necessary for the movement of the vehicle 10. For example, the driving system 130 includes devices for driving a power device of the vehicle 10 and transmitting power generated in the power device to a wheel of the vehicle 10. When the engine of the vehicle 10 is turned on, the driving system 130 may be configured to generate power required for the movement of the vehicle 10. The controller 140 may control the movement of the vehicle 10 by controlling the driving system 130. Furthermore, the driving system 130 may include a braking device configured for stopping/braking the vehicle 10 and a steering device configured for changing a driving direction of the vehicle 10.

The controller 140 may be electrically connected to the electronic devices provided in the vehicle 10 to control each device. The controller 140 may include a processor 141 and a memory 142. The memory 142 may store programs, instructions, and/or applications for performing autonomous driving. The processor 141 may execute the programs, the instructions, and/or the applications stored in the memory 142. A plurality of processors 141 and a plurality of memories 142 may be provided. The controller 140 may include an electronic control unit (ECU) and a micro controller unit (MCU).

The memory 142 may include non-volatile memory devices such as a cache, a read only memory (ROM), a programmable ROM (PROM), an erasable programmable ROM (EPROM), an electrically erasable programmable ROM (EEPROM), and a flash memory. Furthermore, the memory 142 may include a volatile memory device such as a random access memory (RAM) and include storage media such as a Hard Disk Drive (HDD) and a compact disc (CD)-ROM. The types of the memory 142 are not limited to the exemplified memories.

Devices provided in the vehicle 10 are not limited to the exemplified devices. In addition to the above-described devices, the vehicle 10 may include various other devices.

The server 20 may include a communication device 210. The communication device 210 may be an electronic circuit and/or an electronic device to which the above-described communication technologies are applied. The communication device 210 of the server 20 may be controlled to obtain information from the vehicle 10 or transmit information to the vehicle 10.

The server 20 may include a controller 220 as a computing device. The controller 220 of the server 20 may also include a processor 221 and a memory 222. The memory 222 may store programs, instructions, and/or applications for executing an autonomous vehicle driving method. The processor 221 may execute the programs, the instructions, and/or the applications stored in the memory 222.

The controller 220 of the server 20 may be configured to generate data and/or information necessary for executing the autonomous vehicle driving method. For example, the controller 220 may be configured to generate a parking lot map. Furthermore, the controller 220 may be configured to generate priority information related to a plurality of vehicles entering an intersection area within the parking lot. The controller 220 may be configured to generate control information for controlling a plurality of vehicles.

For convenience of description, devices having the same name among the components of the vehicle 10 and the server 20 may be distinguished by attaching ordinal numbers such as first and second. For example, the controller 140 of the vehicle 10 may be referred to as a first controller, and the controller 220 of the server 20 may be referred to as a second controller.

Hereinafter, an operation of the disclosed autonomous driving system is specifically described.

Figure 2:
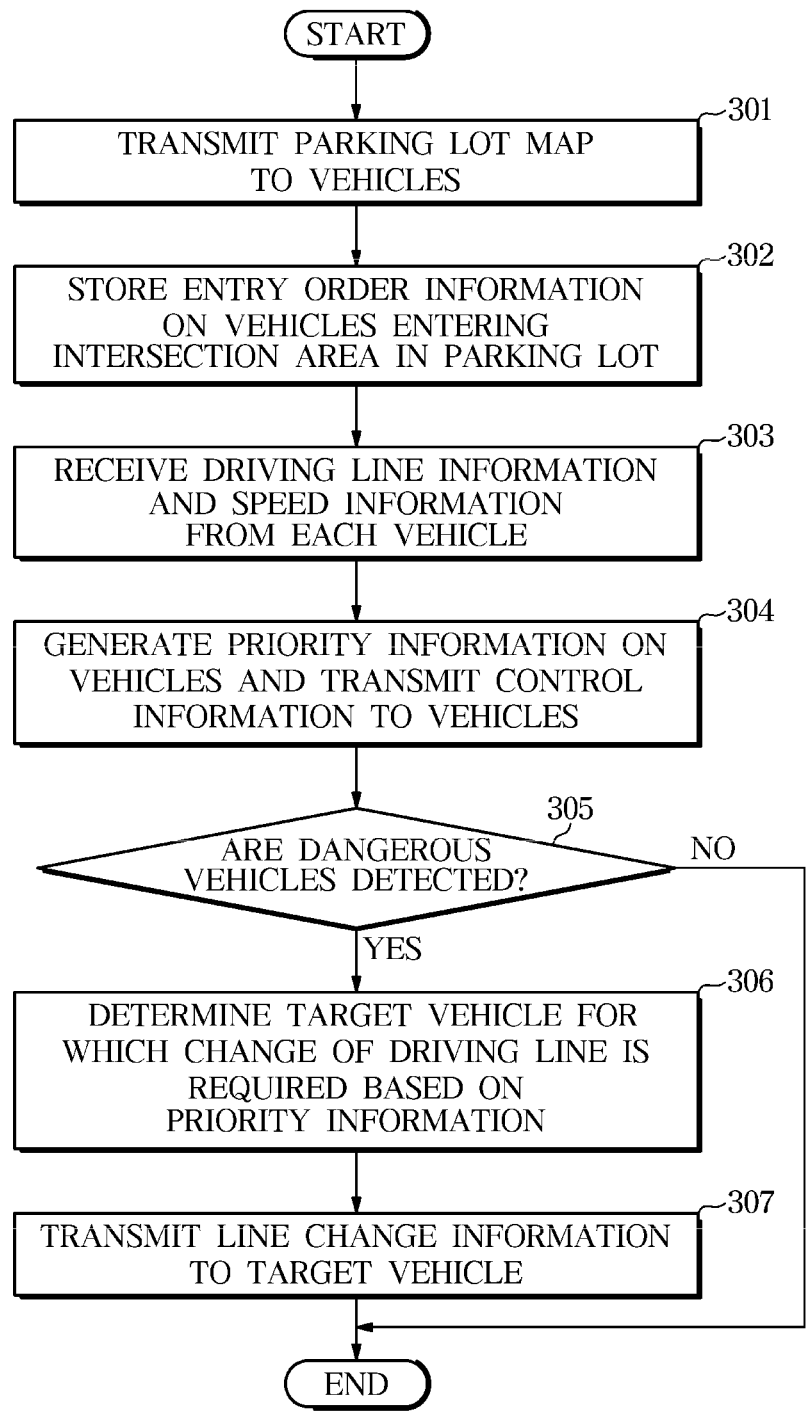
FIG. 2 is a flowchart illustrating an operation of a server performing a method of autonomous vehicle driving according to an exemplary embodiment of the present disclosure.

FIG. 2 is a flowchart illustrating an operation of a server performing a method of autonomous vehicle driving according to an exemplary embodiment of the present disclosure.

Referring to FIG. 2, the server 20 of the autonomous driving system 1 may transmit a parking lot map to a vehicle 10 approaching the parking lot (301). A plurality of vehicles may be present in the parking lot, and the server 20 may communicate with each of the plurality of vehicles. The parking lot map may include a plurality of nodes and a plurality of node lines formed by the plurality of nodes. The parking lot map will be described in detail with reference to FIG. 4.

The server 20 may obtain driving information on each of vehicles entering the intersection area within the parking lot. The driving information may include entry order information indicating the order of the plurality of vehicles entering the intersection area, driving line information selected by each of the plurality of vehicles, and speed information on each of the plurality of vehicles.

In other words, the server 20 may obtain the entry order information indicating the order in which a plurality of vehicles enter the intersection area (302). Furthermore, the server 20 may obtain the driving line information including an intersection entry line and an intersection exit line which are selected by each of the plurality of vehicles from among the plurality of node lines included in the parking lot map and obtain the speed information on each of the plurality of vehicles (303).

The server 20 may be configured to generate the priority information of the plurality of vehicles based on the driving information on the plurality of vehicles and transmit the control information including the priority information to the plurality of vehicles (304). When a risk of collision between the plurality of vehicles is detected, the control information may define an action to be taken by each vehicle. For example, the control information may further include avoidance control information for causing a first vehicle having a relatively high priority to avoid other vehicles among the plurality of vehicles, and stop control information for causing a second vehicle having a relatively low priority to stop temporarily among the plurality of vehicles. The vehicle 10 may pass through the intersection area based on the control information transmitted from the server 20.

To generate the priority information, the server 20 may be configured to predict a transit time required to transit an intersection entry line based on an intersection entry line and the speed information of each of the plurality of vehicles. The server 20 may be configured to determine the priorities of the plurality of vehicles based on the predicted transit time and the entry order information. The server 20 may compare the transit times of the plurality of vehicles. When the transit times of the plurality of vehicles are different, the server 20 may give a high priority to a vehicle having a short transit time among the plurality of vehicles. When the transit times of the plurality of vehicles are the same, the server 20 may give a higher priority to a vehicle entering the intersection area earliest.

The server 20 may detect dangerous vehicles having risks of collision in the intersection area in advance based on the driving information obtained from the plurality of vehicles (305). The server 20 may detect dangerous vehicles by comparing intersection entry lines and intersection exit lines of the plurality of vehicles. For example, when overlapping node lines among the intersection entry lines and the intersection exit lines of the plurality of vehicles are present, the server 20 may be configured to determine vehicles having the overlapping node lines as the dangerous vehicles. The server 20 may be configured to determine vehicles, which are scheduled to travel in directions facing each other along the same node line among the plurality of node lines included in the parking lot map, as the dangerous vehicles. The detection of the dangerous vehicles will be described in detail with reference to FIG. 7.

When the dangerous vehicles are detected, the server 20 may be configured to determine a target vehicle for which a change of a driving line is required among the dangerous vehicles based on the priority information (306). The server 20 may be configured to determine a vehicle having a relatively low priority among the detected dangerous vehicles as the target vehicle. For collision avoidance, the server 20 may change an intersection entry line of the target vehicle and transmit line change information including the changed intersection entry line to the target vehicle (307). The target vehicle may move along the changed intersection entry line based on the line change information. Furthermore, in addition to the intersection entry line of the target vehicle, the server 20 may change an intersection exit line of the target vehicle.

When the dangerous vehicles are not detected, the server 20 may not generate the line change information. Therefore, each of the plurality of vehicles may pass through the intersection according to a selected driving line and the priority information transmitted from the server 20.

Alternatively, the server 20 may be configured to generate the line change information in response to receiving a line change request from the vehicle 10. In the instant case, the server 20 may give the highest priority to a vehicle 10 transmitting a line change request. Furthermore, the server 20 may change the driving line of the vehicle 10 transmitting the line change request and transmit the line change information including the changed driving line to the vehicle 10.

In the present way, the disclosed autonomous driving system 1 may allow the plurality of vehicles to pass through without stopping by appropriately controlling movement paths of the plurality of vehicles at the intersection within the parking lot, prevent a collision between the plurality of vehicles, and reduce congestion at the intersection.

Figure 3:
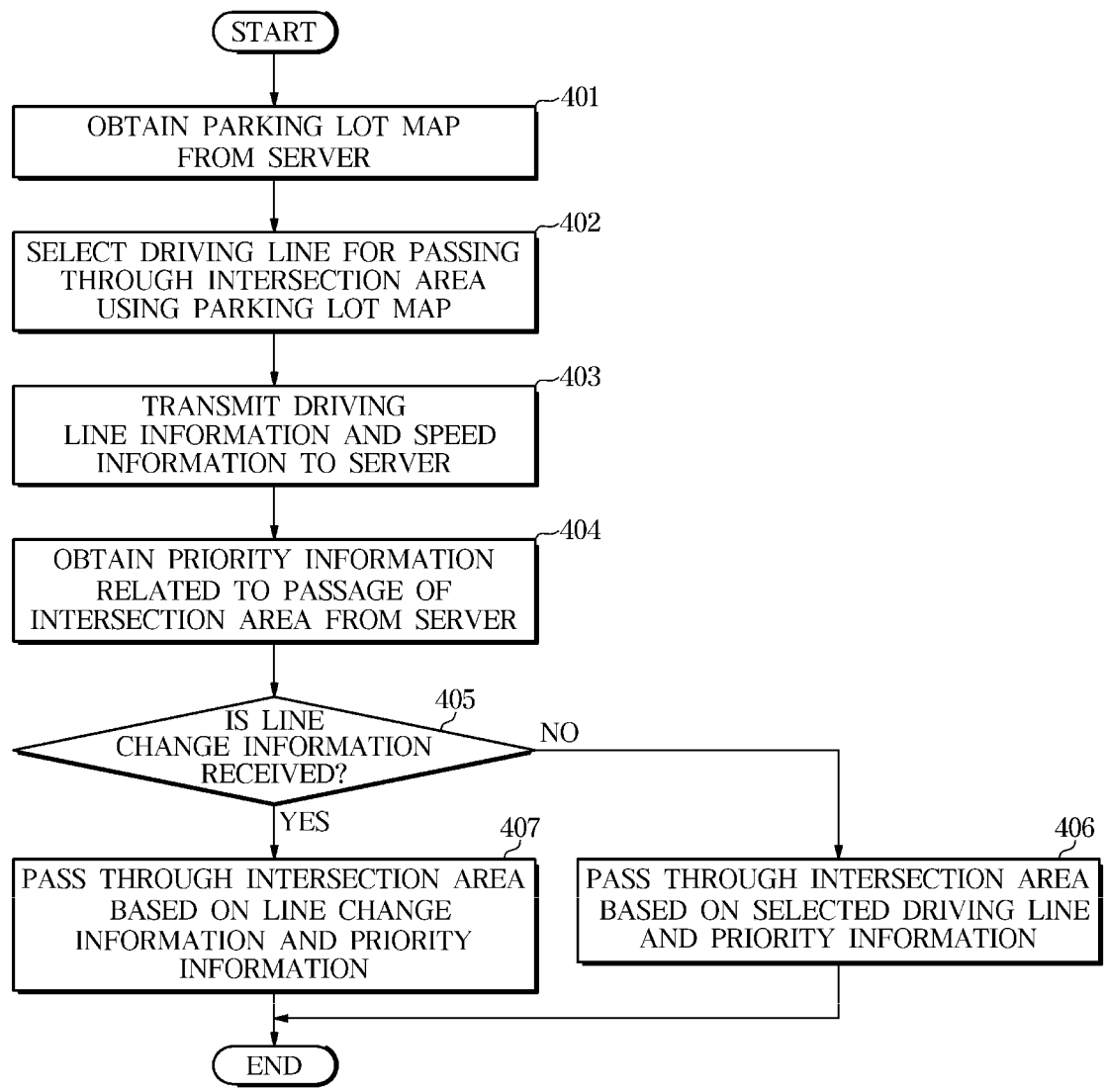
FIG. 3 is a flowchart illustrating an operation of a vehicle by the method of autonomous vehicle driving according to an exemplary embodiment of the present disclosure.

FIG. 3 is a flowchart illustrating an operation of a vehicle by the method of autonomous vehicle driving according to an exemplary embodiment of the present disclosure.

Referring to FIG. 3, the vehicle 10 may obtain the parking lot map from the server 20 (401). The vehicle 10 may select a driving line using the parking lot map (402). For example, the vehicle 10 may select a driving line for moving to an empty parking slot in the parking lot map. Conversely, the vehicle 10 may select a driving line for moving out of the parking slot to move to out of the parking lot. The intersection may be present on a path in which the vehicle 10 moves to the empty parking slot or moves out of the parking lot, and the vehicle 10 may select node lines to pass through the intersection. The vehicle 10 may select an intersection entry line and an intersection exit line from among the plurality of node lines included in the parking lot map. The vehicle 10 may transmit driving line information including the intersection entry line and the intersection exit line to the server 20. Furthermore, the vehicle 10 may transmit the speed information to the server 20 (403).

The vehicle 10 may obtain priority information related to the passage of the intersection area from the server 20 (404). Furthermore, when a risk of collision with other vehicles is detected, the vehicle 10 may obtain control information defining an action to be taken from the server 20. For example, when the vehicle 10 has a higher priority than other vehicles, the vehicle 10 may receive avoidance control information instructed to avoid other vehicles. Conversely, when the vehicle 10 has a lower priority than other vehicles, the vehicle 10 may receive stop control information instructed to stop. Although it has been described that the priority information and the control information are distinguished, the present disclosure is not limited thereto. The avoidance control information and the stop control information may be included in the priority information.

A vehicle 10 not receiving the line change information from the server 20 may pass through the intersection area based on the selected driving line and the priority information (405 and 406). However, when the vehicle 10 receives the line change information from the server 20, the vehicle 10 may pass through the intersection area based on the line change information and the priority information (405 and 407). The line change information may include a change command of an intersection entry line. The vehicle 10 may move to the intersection entry line which is changed by the server 20. A priority of the vehicle 10 receiving the line change information may be lower than those of other vehicles. Despite the line change of the vehicle 10, an accident may occur due to an unexpected cause such as a failure of the vehicle 10. Therefore, when a collision risk is detected as other vehicles approach, the vehicle 10 having a lower priority may be controlled to stop.

Figure 4:
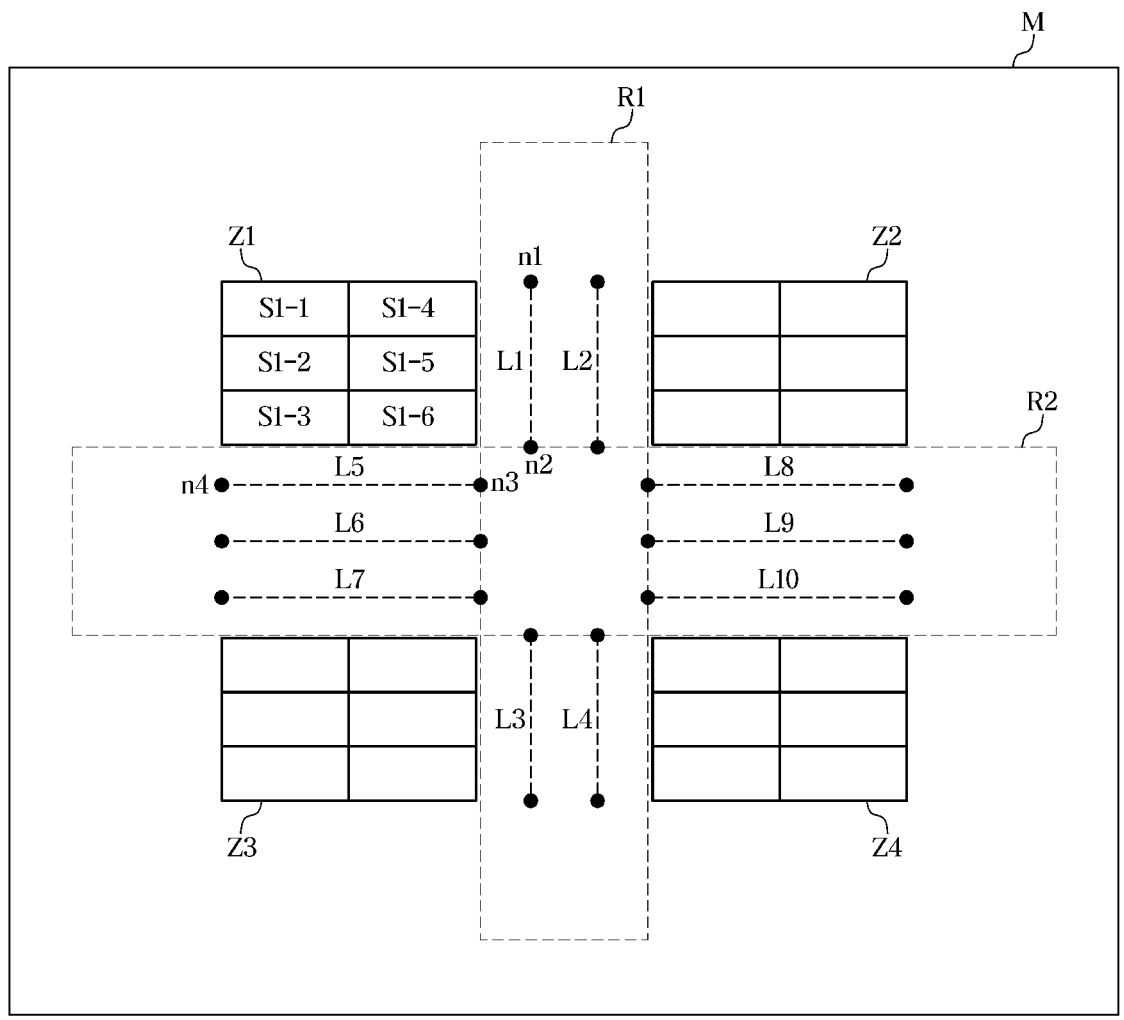
FIG. 4 is a diagram illustrating a parking lot map according to an exemplary embodiment of the present disclosure.

FIG. 4 is a diagram illustrating a parking lot map according to an exemplary embodiment of the present disclosure.

Referring to FIG. 4, a parking lot map M may be stored in the server 20 in advance or may be generated by the server 20. The parking lot map M may include a plurality of parking blocks Z1, Z2, Z3, and Z4. Each of the parking blocks Z1, Z2, Z3, and Z4 may include a plurality of parking slots. For example, the first parking block Z1 may include six parking slots S1-1, S1-2, S1-3, S1-4, S1-5, and S1-6. The parking slot means a space in which one vehicle 10 may park.

An intersection area may be formed by roads R1 and R2 between the parking blocks Z1, Z2, Z3, and Z4. When the four parking blocks Z1, Z2, Z3, and Z4 are disposed at regular intervals from each other, the first road R1 and the second road R2 may vertically intersect. The intersection area may mean the first road R1 and the second road R2.

Furthermore, the parking lot map M may include a plurality of nodes n1, n2, n3, n4, . . . and a plurality of node lines L1, L2, L3, . . . , and L10 formed by the plurality of nodes. The plurality of nodes n1, n2, n3, n4, . . . may be formed at positions corresponding to corners of each of the parking blocks Z1, Z2, Z3, and Z4 which form the intersection area. The plurality of nodes n1, n2, n3, n4, . . . may be marked on the first road R1 and the second road R2. The plurality of nodes n1, n2, n3, n4, . . . may be marked at positions separated a predetermined distance from corners of each of the parking blocks Z1, Z2, Z3, and Z4.

For example, on the first road R1, the first node n1 may be marked at a position corresponding to an upper right corner of the first parking block Z1, and the second node n2 may be marked at a position corresponding to a lower right corner of the first parking block Z1. Furthermore, on the second road R2, the third node n3 may be marked at a position corresponding to the lower right corner of the first parking block Z1, and the fourth node n4 may be marked at a position corresponding to a lower left corner of the first parking block Z1. In the same manner, the plurality of nodes may be marked at positions adjacent to the corners of the second parking block Z2, the third parking block Z3, and the fourth parking block Z4.

The number of nodes marked between two parking blocks may vary according to a width between the two parking blocks. As a distance between the parking blocks is increased, the number of nodes marked between the parking blocks may also be increased. For example, four nodes may be marked between the first parking block Z1 and the second parking block Z2, and six nodes may be marked between the first parking block Z1 and the third parking block Z3.

The plurality of node lines L1, L2, L3, . . . , and L10 may be generated by connecting two among the plurality of nodes n1, n2, n3, n4, . . . using a straight line. The plurality of node lines L1, L2, L3, . . . , and L10 may be disposed in parallel with each other between the parking blocks Z1, Z2, Z3, and Z4. That is, the node lines L1, L2, L3, . . . , and L10 may be disposed in parallel with each other on the first road R1 and the second road R2.

For example, the first node line L1 may be generated as a straight line connecting the first node n1 to the second node n2. The remaining nine node lines L2 to L10 shown in FIG. 4 may also each be generated as a straight line connecting two nodes. Furthermore, on the first road R1, the first node line L1 and the second node line L2 may be disposed in parallel, and the third node line L3 and the fourth node line L4 may also be disposed in parallel. On the second road R2, the fifth node line L5, the sixth node line L6, and the seventh node line L7 are disposed in parallel with each other, and the eighth node line L8, the ninth node line L9, and the tenth node line L10 are also disposed in parallel with each other.

Figure 5:
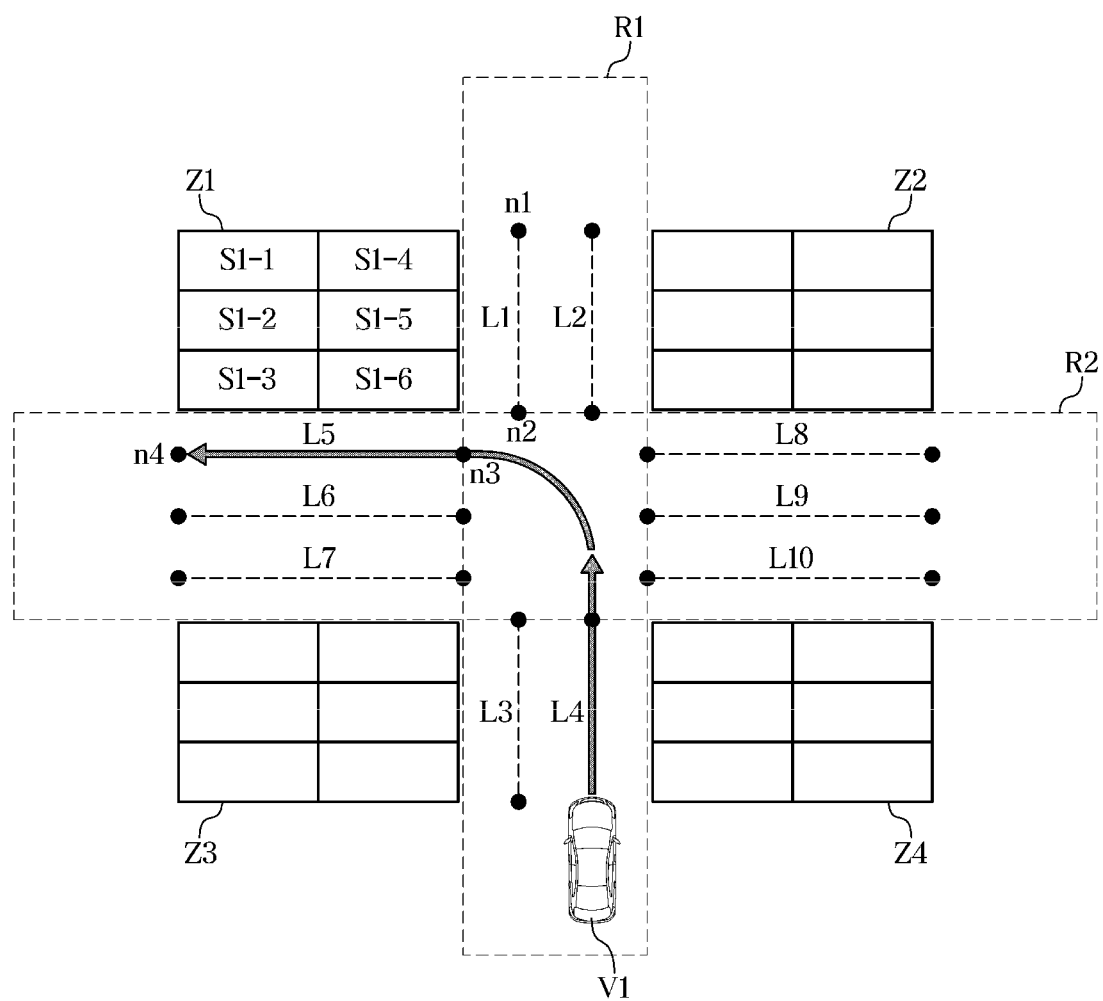
FIG. 5 is a diagram illustrating a driving line of a vehicle passing through an intersection area in a parking lot.

FIG. 5 is a diagram illustrating a driving line of a vehicle passing through an intersection area in a parking lot. FIG. 6 is a diagram illustrating driving information and priority information of the vehicle described in FIG. 5.

Referring to FIG. 5, a situation in which a first vehicle V1 enters the first road R1 forming the intersection area is illustrated. After obtaining the parking lot map M from the server 20, the first vehicle V1 may select the fourth node line L4 as an intersection entry line for passing through the intersection area and select the fifth node line L5 as an intersection exit line. The first vehicle V1 may transmit driving line information including a selected intersection entry line and a selected intersection exit line to the server 20. Furthermore, the first vehicle V1 may transmit current speed information to the server 20.

Referring to a table 600 of FIG. 6, the server 20 may store driving information on the first vehicle V1. The server 20 may record a license plate number of the first vehicle V1, an order in which the first vehicle V1 enters the intersection area, and the intersection entry line and the intersection exit line which are selected by the first vehicle V1. Furthermore, the server 20 may be configured to determine and store a transit time required for the first vehicle V1 to transit the intersection entry line based on the intersection entry line and the speed information of the first vehicle V1. For example, the transit time of the first vehicle V1 may be determined as 4T.

The server 20 may be configured to determine a priority of the first vehicle V1 based on the intersection entry order and the intersection transit time. In FIG. 5, since a vehicle entering the intersection area is only the first vehicle V1, the entry order of the first vehicle V1 is recorded as first, and the server 20 may give a first priority to the first vehicle V1.

The first vehicle V1 may receive priority information from the server 20. As long as the first vehicle V1 does not receive line change information from the server 20, the first vehicle V1 may pass through the intersection area along the fourth node line L4 and the fifth node line L5 which are the selected driving lines.

Figure 7:
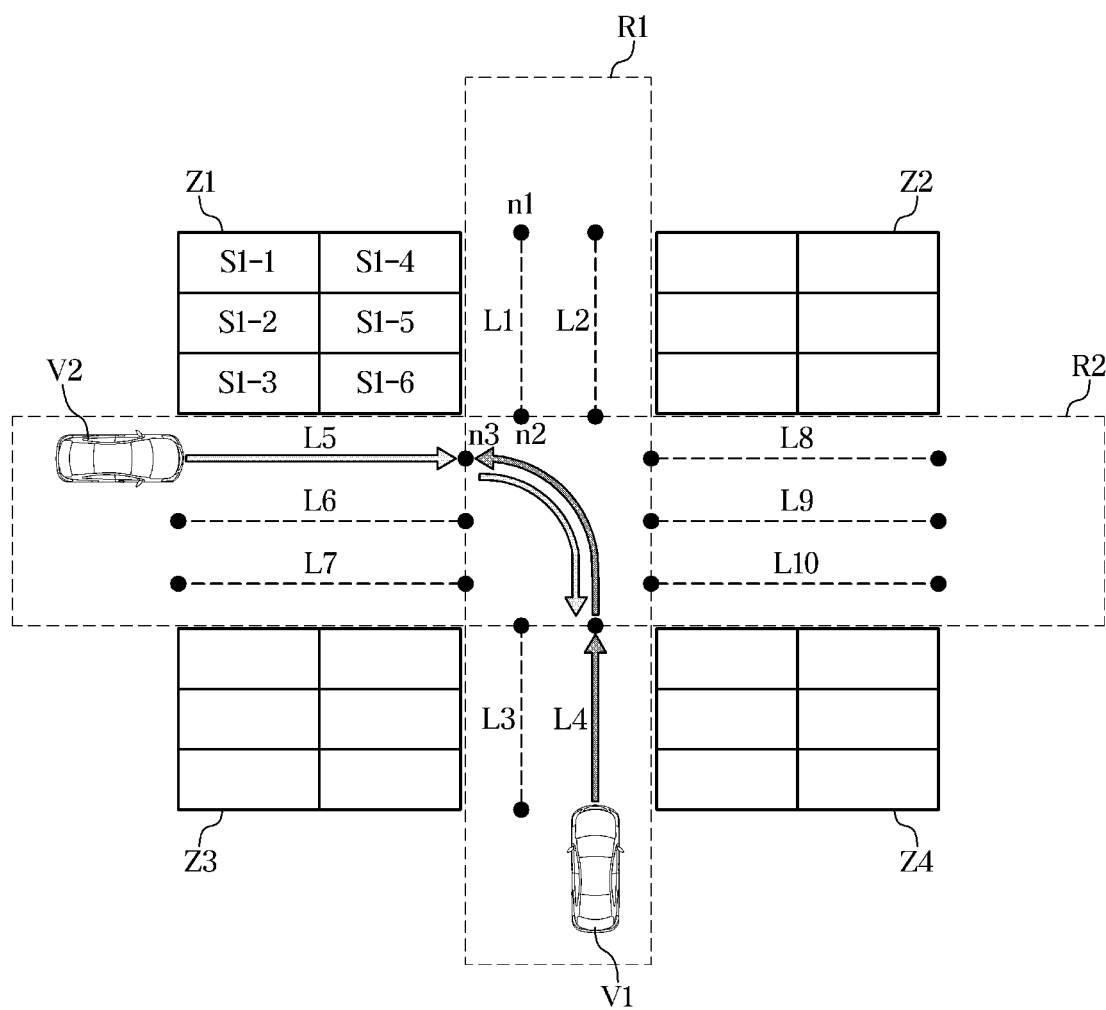
FIG. 7 is a diagram illustrating driving lines of a plurality of vehicles entering an intersection area within a parking lot.
Figure 8:
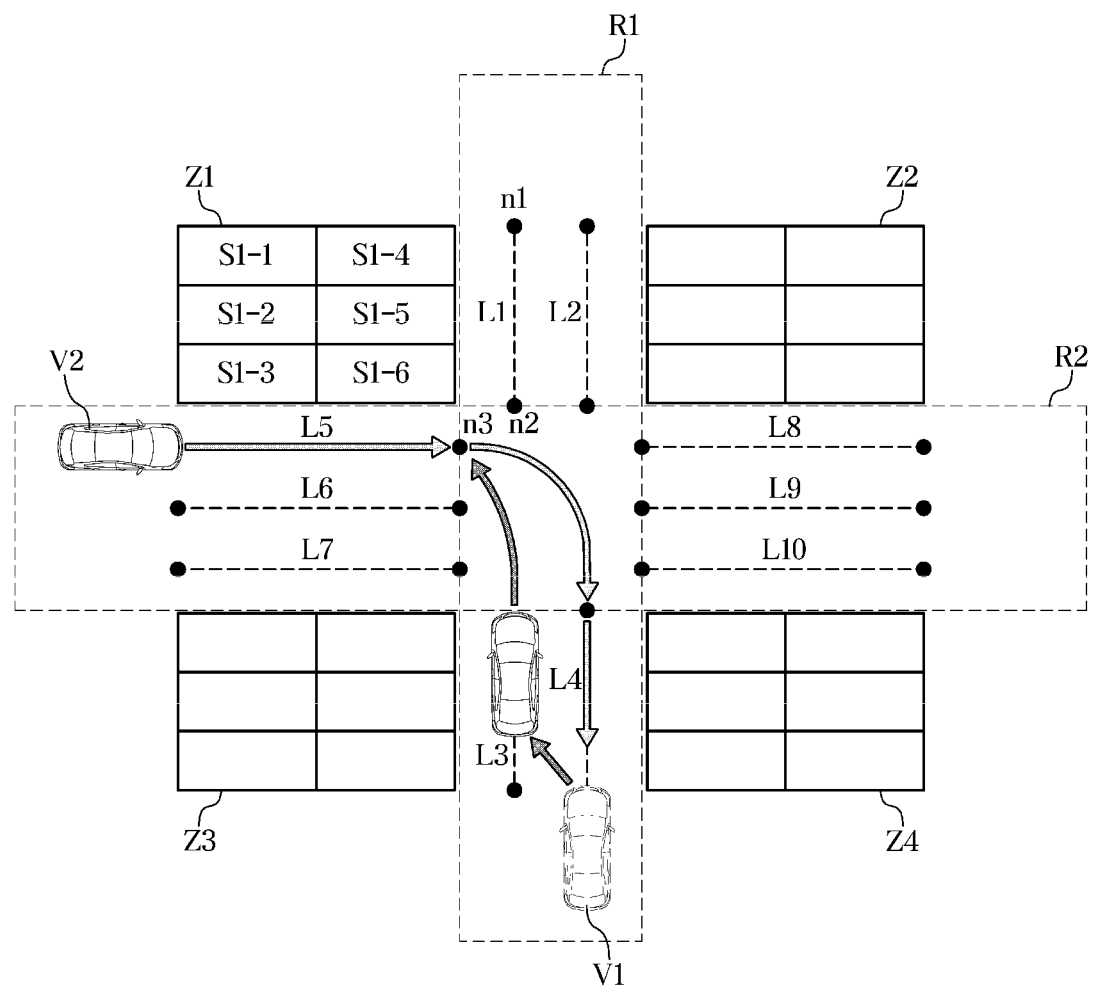
FIG. 8 is a diagram illustrating an example in which the plurality of vehicles described in FIG. 7 are controlled to pass through the intersection area.

FIG. 7 is a diagram illustrating driving lines of a plurality of vehicles entering an intersection area within a parking lot. FIG. 8 is a diagram illustrating an example in which the plurality of vehicles described in FIG. 7 are controlled to pass through the intersection area.

Referring to FIG. 7, a situation in which the first vehicle V1 and a second vehicle V2 enter the intersection area is illustrated. The first vehicle V1 may enter the first road R1, and the second vehicle V2 may enter the second road R2. When the first vehicle V1 and the second vehicle V2 enter the intersection area at the same time, the server 20 may record an entry order of each of the first vehicle V1 and the second vehicle V2 as first. When the first vehicle V1 first enters the first road R1 and then the second vehicle V2 enters the second road R2, the server 20 may record the entry order of the first vehicle V1 as first, and the entry order of the second vehicle V2 as second.

The first vehicle V1 and the second vehicle V2 may each obtain the parking lot map M from the server 20. The first vehicle V1 may select the fourth node line L4 as a first intersection entry line for passing through the intersection area and select the fifth node line L5 as a first intersection exit line. The second vehicle V2 may select the fifth node line L5 as a second intersection entry line and select the fourth node line L4 as a second intersection exit line. The first vehicle V1 and the second vehicle V2 may transmit driving line information including the selected intersection entry lines and the selected intersection exit lines to the server 20.

Furthermore, the first vehicle V1 and the second vehicle V2 may transmit current speed information to the server 20. When the first vehicle V1 first enters the first road R1 and then the second vehicle V2 enters the second road R2, the server 20 may request retransmission of the driving information from the first vehicle V1 at a time when the second vehicle V2 enters the intersection area. In response to the request of the server 20, the first vehicle V1 may retransmit the driving line information and the current speed information.

The server 20 may be configured to determine the priority of each of the first vehicle V1 and the second vehicle V2 based on the intersection entry order, the driving line information, and the current speed information of the first vehicle V1 and the second vehicle V2 and may transmit the priority information to the first vehicle V1 and the second vehicle V2.

Based on the intersection entry line and the speed information of each of the first vehicle V1 and the second vehicle V2, the server 20 may be configured to determine a first transit time required for the first vehicle V1 to transit the intersection entry line and a second transit time required for the second vehicle V2 to transit the intersection entry line. The server 20 may give a priority to each of the first vehicle V1 and the second vehicle V2 by comparing the first transit time of the first vehicle V1 with the second transit time of the second vehicle V2.

For example, when the second transit time of the second vehicle V2 is shorter than the first transit time of the first vehicle V1, the server 20 may give a higher priority to the second vehicle V2 than the first vehicle V1. On the other hand, when the first transit time of the first vehicle V1 is the same as the second transit time of the second vehicle V2, the server 20 gives a higher priority to the first vehicle V1 which enters the intersection earlier.

The server 20 may detect a collision risk between the first vehicle V1 and the second vehicle V2 in advance based on first driving information of the first vehicle V1 and second driving information of the second vehicle V2 which enter the intersection area. The server 20 may be configured to determine vehicles, which are scheduled to travel in directions facing each other along the same node line, as dangerous vehicles. The server 20 may detect dangerous vehicles by comparing the intersection entry lines and the intersection exit lines of the first vehicle V1 and the second vehicle V2. For example, in FIG. 7, the first intersection entry line of the first vehicle V1 and the second intersection exit line of the second vehicle V2 are the same fourth node line L4. The first intersection exit line of the first vehicle V1 and the second intersection entry line of the second vehicle V2 are the same fifth node line L5. That is, the first vehicle V1 and the second vehicle V2 are scheduled to travel in directions facing each other along the same node lines. Therefore, the server 20 may be configured to determine the first vehicle V1 and the second vehicle V2 as dangerous vehicles.

The server 20 may be configured to determine a target vehicle for which a change of a driving line is required among the first vehicle V1 and the second vehicle V2 based on the priority information. The server 20 may be configured to determine a vehicle having a relatively low priority among the first vehicle V1 and the second vehicle V2 as the target vehicle. When the priority of the first vehicle V1 is low, the first vehicle V1 may be determined as the target vehicle.

For collision avoidance between the first vehicle V1 and the second vehicle V2, the server 20 may change the first intersection entry line of the first vehicle V1 having a low priority and transmit line change information including the changed first intersection entry line to the first vehicle V1.

As shown in FIG. 8, the server 20 may change the first intersection entry line of the first vehicle V1 from the fourth node line L4 to the third node line L3. Accordingly, the first vehicle V1 may travel along the changed third node line L3, and the second vehicle V2 may travel along the fourth node line L4. Even when the second vehicle V2 first transits the fifth node line L5 and then enters the fourth node line L4, since the first vehicle V1 travels along the third node line L3, a collision risk between the first vehicle V1 and the second vehicle V2 on the fourth node line L4 may be eliminated. Furthermore, the first vehicle V1 and the second vehicle V2 may continue to travel without stopping.

An example in which the first intersection entry line of the first vehicle V1, which is the target vehicle, is changed has been described, but the present disclosure is not limited thereto. The server 20 may also change the first intersection exit line of the first vehicle V1.

FIG. 9 is a diagram illustrating priority information and line change information which are generated to control the plurality of vehicles described in FIG. 8.

Referring to a first table 810 of FIG. 9, the server 20 may store the first driving information of the first vehicle V1 and the second driving information of the second vehicle V2. The server 20 may record license plate numbers of the first vehicle V1 and the second vehicle V2, the entry order of the first vehicle V1 and the second vehicle V2, and the intersection entry lines and intersection exit lines of the first vehicle V1 and the second vehicle V2. Furthermore, the server 20 may be configured to determine and store the first transit time required for the first vehicle V1 to transit the intersection entry line and the second transit time required for the second vehicle V2 to transit the intersection entry line. For example, the first transit time of the first vehicle V1 may be determined as 4T, and the second transit time of the second vehicle V2 may be determined as 2T.

Referring to a second table 820 of FIG. 9, since the second transit time of the second vehicle V2 is shorter than the first transit time of the first vehicle V1, the server 20 may give a first priority to the second vehicle V2 and give a second priority to the first vehicle V1. That is, even when the entry order of the first vehicle V1 is earlier than that of the second vehicle V2, the priority of the first vehicle V1 may be determined to be lower than that of the second vehicle V2. The server 20 may be configured to generate priority information including the priority of each of the first vehicle V1 and the second vehicle V2 and transmit the priority information to each of the first vehicle V1 and the second vehicle V2.

Referring to a third table 830 of FIG. 9, the server 20 may change the first intersection entry line of the first vehicle V1 from the fourth node line L4 to the third node line L3. The server 20 may transmit line change information including the changed first intersection entry line to the first vehicle V1.

Figure 11:
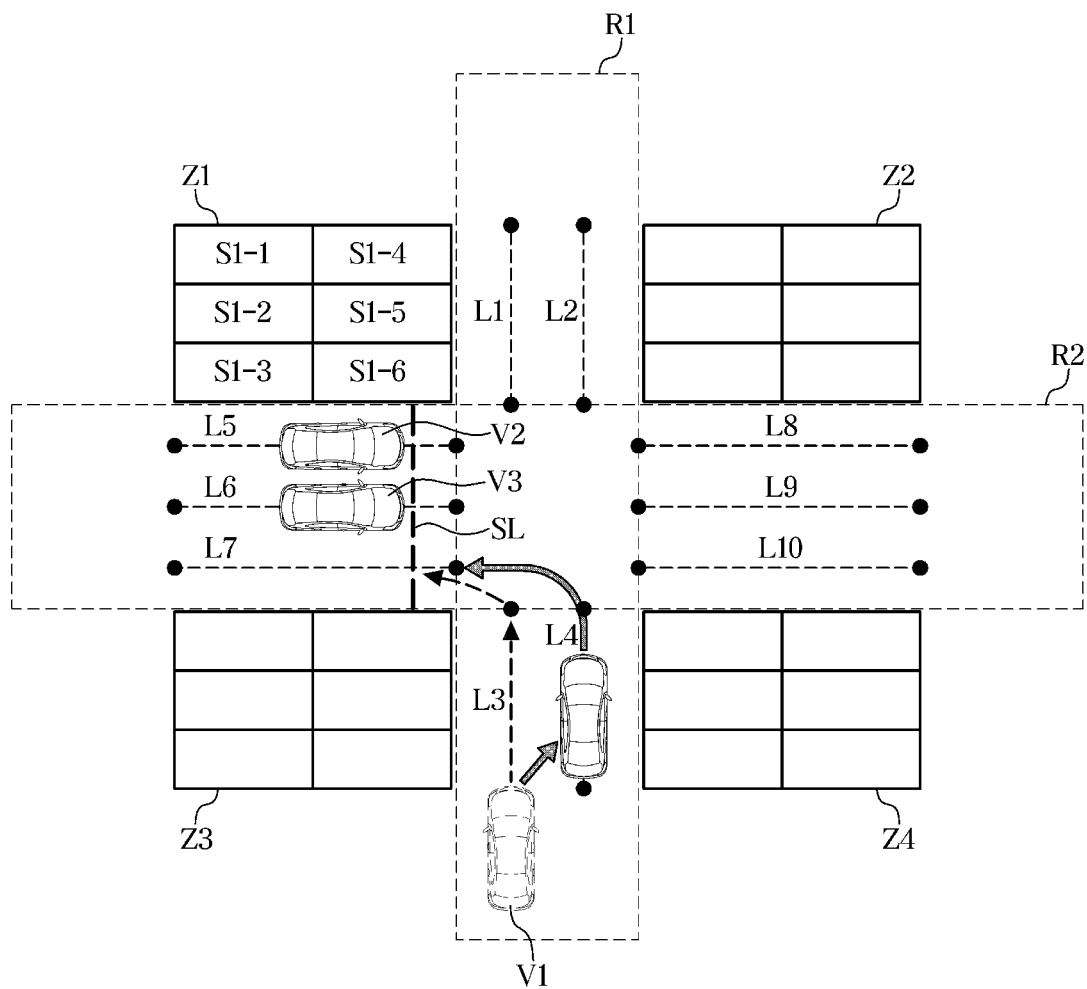
FIG. 11 is a diagram illustrating operations of other vehicles and the turning vehicle described in FIG. 10.

FIG. 10 is a flowchart illustrating an operation of a server which receives a line change request from a turning vehicle turning in an intersection area. FIG. 11 is a diagram illustrating operations of other vehicles and the turning vehicle described in FIG. 10.

Referring to FIG. 10, the server 20 may receive pieces of driving line information and pieces of speed information from a plurality of vehicles entering the intersection area (303). Furthermore, the server 20 may receive a line change request from a turning vehicle among the plurality of vehicles present in the intersection area (1001). The turning vehicle may mean a vehicle intending to turn in the intersection area. When a turning radius determined by an intersection entry line and an intersection exit line is smaller than a predetermined minimum turning radius, the turning vehicle may be configured to determine a situation in which a turn is not possible. In the instant case, the turning vehicle may transmit a line change request for requesting a change of at least one of an intersection entry line and an intersection exit line to the server 20.

The server 20 may give the highest priority to the turning vehicle transmitting the line change request and transmit the priority information to the plurality of vehicles (1002). The server 20 may change the driving line of the turning vehicle requesting the line change and transmit line change information including the changed driving line to the turning vehicle (1003). The server 20 may change at least one of the intersection entry line and the intersection exit line of the turning vehicle. The turning vehicle may pass through the intersection area based on the line change information and the priority information.

Referring to FIG. 11, when the first vehicle V1 enters the intersection area, the intersection entry line of the first vehicle V1 may be selected as the third node line L3, and the intersection exit line thereof may be selected as the seventh node line L7. However, a turning radius determined by the third node line L3 and the seventh node line L7 may be smaller than the predetermined minimum turning radius of the first vehicle V1. In the instant case, the first vehicle V1 may not be able to travel along the seventh node line L7.

The first vehicle V1 may transmit a line change request to the server 20. The server 20 may change the intersection entry line of the first vehicle V1 to the fourth node line L4 and transmit the line change information to the first vehicle V1. A turning radius determined by the fourth node line L4 and the seventh node line L7 may be greater than the predetermined minimum turning radius. Accordingly, the first vehicle V1 may travel along the seventh node line L7 after transiting the fourth node line L4.

Meanwhile, when other vehicles are present on a road where the intersection exit line of the turning vehicle is located, the other vehicles may be controlled to stop until the turning vehicle transits the intersection exit line. For example, as shown in FIG. 11, the second vehicle V2 and a third vehicle V3 may be present on the second road R2 including the seventh node line L7 which is the intersection exit line of the first vehicle V1. Since the highest priority is provided to the first vehicle V1, the second vehicle V2 and the third vehicle V3, which have lower priorities than the first vehicle V1, may be controlled to stop until the first vehicle V1 transits the seventh node line L7. When the second vehicle V2 and the third vehicle V3 are adjacent to a stop line SL, the second vehicle V2 and the third vehicle V3 may be controlled to stop.

In the present way, by adjusting the driving line of the vehicle requesting the line change and by giving the highest priority to the vehicle requesting the line change, it is possible to facilitate the traveling of the vehicles in the intersection area.

Figure 12:
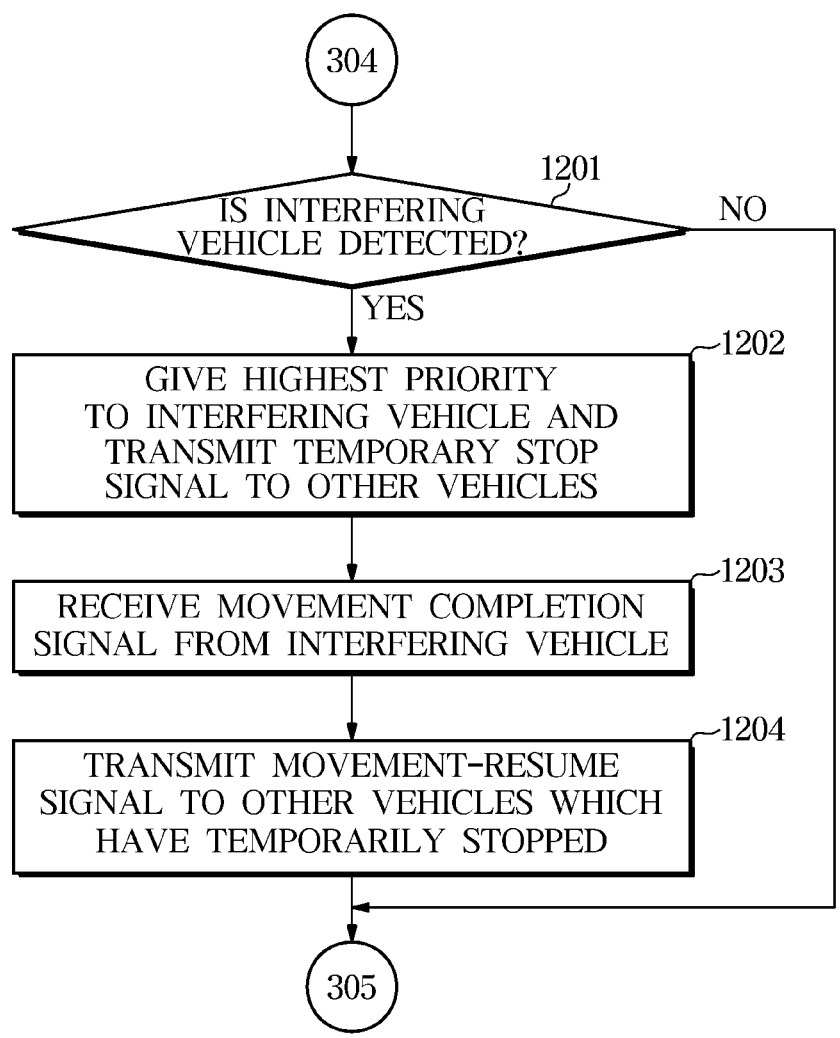
FIG. 12 is a flowchart illustrating an operation of the server when an interfering vehicle is entering or coming out of a parking block is identified.
Figure 13:
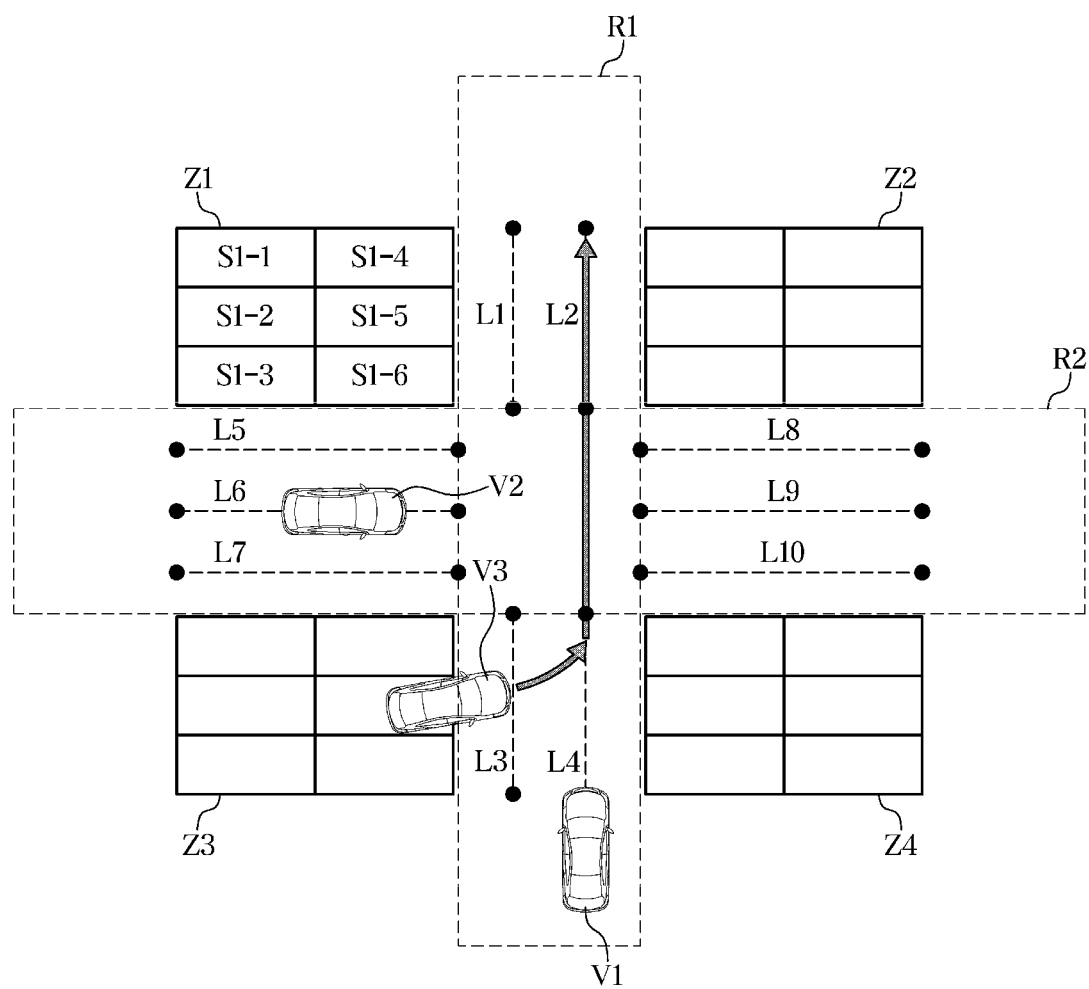
FIG. 13 is a diagram illustrating operations of other vehicles and the interfering vehicle described in FIG. 12.

FIG. 12 is a flowchart illustrating an operation of the server when an interfering vehicle entering or coming out of a parking block is identified. FIG. 13 is a diagram illustrating operations of other vehicles and the interfering vehicle described in FIG. 12.

Referring to FIG. 12, the server 20 may be configured to generate the priority information of the plurality of vehicles based on the driving information on the plurality of vehicles and transmit the control information including the priority information to the plurality of vehicles (304). The plurality of vehicles may pass through the intersection area based on the control information transmitted from the server 20.

Furthermore, the server 20 may identify an interfering vehicle which is entering the parking block Z1, Z2, Z3, or Z4 or coming out of the parking block Z1, Z2, Z3, or Z4 (1201). The server 20 may give the highest priority to the interfering vehicle based on the identification of the interfering vehicle. The server 20 may transmit a temporary stop signal to other vehicles entering the intersection area along the intersection entry lines (1202). After completing the movement, the interfering vehicle may transmit a movement completion signal to the server 20 (1203). The server 20 may transmit a movement-resume signal to other vehicles which have temporarily stopped based on the reception of the movement completion signal from the interfering vehicle (1204).

Referring to FIG. 13, the first vehicle V1 may enter the intersection area along the fourth node line L4 of the first road R1, and the second vehicle V2 may enter the intersection area along the sixth node line L6 of the second road R2. Furthermore, the server 20 may detect the third vehicle V3 which is coming out of the third parking block Z3. The third vehicle V3 may be an interfering vehicle which interferes the movements of the first vehicle V1 and the second vehicle V2. In the instant case, due to the third vehicle V3, congestion between the first vehicle V1, the second vehicle V2, and the third vehicle V3 may occur, and there is a risk of an accident occurring.

As described above, the plurality of vehicles may be differently controlled according to their priorities. A vehicle having a relatively high priority may be controlled to move for avoiding other vehicles, and other vehicles having relatively low priorities may be controlled to stop. To prevent congestion between the first vehicle V1, the second vehicle V2, and the third vehicle V3, the server 20 may give the highest priority to the third vehicle V3 so that the third vehicle V3 moves first. Therefore, the third vehicle V3 having the highest priority may be controlled to move first by avoiding the first vehicle V1 and the second vehicle V2.

Furthermore, the server 20 may transmit a temporary stop signal to the first vehicle V1 and the second vehicle V2. After receiving a movement completion signal from the third vehicle V3, the server 20 may transmit a movement-resume signal to the first vehicle V1 and the second vehicle V2 which have temporarily stopped. The first vehicle V1 and the second vehicle V2 may follow the existing driving lines based on the reception of the movement-resume signal.

As described above, according to the included autonomous driving systems and vehicle autonomous driving methods, the plurality of vehicles can pass through without stopping by appropriately adjusting the movement paths of the plurality of vehicles at the intersection within the parking lot.

Furthermore, according to the included autonomous driving systems and vehicle autonomous driving methods, the plurality of vehicles passing through the intersection can avoid collisions, and congestion at the intersection may be reduced.

Meanwhile, the disclosed exemplary embodiments of the present disclosure may be implemented the form of a recording medium storing instructions executable by a computer. The instructions may be stored in a form of program code, and when executed by a processor, may be configured to generate a program module to perform the operations of the disclosed exemplary embodiments of the present disclosure. The recording medium may be implemented as a computer-readable recording medium.

The computer-readable recording medium includes all kinds of recording media storing instructions which are readable by a computer. For example, there may be a read only memory (ROM), a random access memory (RAM), a magnetic tape, a magnetic disk, a flash memory, an optical data storage device, and the like.

In accordance with the disclosed autonomous driving systems and vehicle autonomous driving methods, a plurality of vehicles can pass through without stopping by appropriately adjusting movement paths of the plurality of vehicles at an intersection within a parking lot.

Furthermore, in accordance with the disclosed autonomous driving systems and vehicle autonomous driving methods, the plurality of vehicles passing through the intersection can avoid collisions, and congestion at the intersection may be reduced.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An autonomous driving system comprising:
    a server; and
    a plurality of vehicles configured to communicate with the server,
    wherein the server is configured to:
        obtain driving information on each of the plurality of vehicles entering an intersection area within a parking lot;
        generate priority information on each of the plurality of vehicles based on the driving information on each of the plurality of vehicles; and
        transmit control information including the priority information to each of the plurality of vehicles based on the priority information so that the plurality of vehicles pass through the intersection area,
        wherein, when a collision risk due to the plurality of vehicles is detected, the control information includes avoidance control information for causing a first vehicle having a relatively high priority to avoid other vehicles among the plurality of vehicles, and stop control information for causing a second vehicle having a relatively low priority to stop temporarily among the plurality of vehicles, and
    the server is further configured to:
        in response to receiving a line change request from a turning vehicle among the plurality of vehicles, give a highest priority to the turning vehicle; and
        change a driving line of the turning vehicle and transmit line change information including the changed driving line to the turning vehicle.

2. The autonomous driving system of claim 1, wherein the server is further configured to:
    transmit a parking lot map, which includes a plurality of nodes and a plurality of node lines formed by the plurality of nodes, to the plurality of vehicles;
    obtain driving line information including intersection entry lines and intersection exit lines, which are selected by the plurality of vehicles among the plurality of node lines; and
    obtain speed information on each of the plurality of vehicles and entry order information indicating an order of the plurality of vehicles entering the intersection area.

3. The autonomous driving system of claim 2, wherein the server is further configured to:
    generate the plurality of nodes at positions corresponding to corners of each of parking blocks forming the intersection area; and
    generate a plurality of node lines by connecting two among the plurality of nodes with a straight line and arrange the plurality of node lines in parallel with each other between the parking blocks.

4. The autonomous driving system of claim 2, wherein the server is further configured to:
    predict a transit time required to transit an intersection entry line based on the intersection entry line and the speed information on each of the plurality of vehicles to generate the priority information; and
    determine a priority of each of the plurality of vehicles based on the transit time and the entry order information.

5. The autonomous driving system of claim 4, wherein the server is further configured to:
    compare the transit times of the plurality of vehicles;
    when the transits times of the plurality of vehicles are different, give a high priority to a vehicle having a shortest transit time among the plurality of vehicles; and
    when the transit times of the plurality of vehicles are a same, give a higher priority to a vehicle entering the intersection area earlier among the plurality of vehicles.

6. The autonomous driving system of claim 2, wherein the server is further configured to:
    detect vehicles scheduled to travel in directions facing each other along a same node line;
    determine a target vehicle for which a change of a driving line is required among the detected vehicles based on the priority information;
    change an intersection entry line of the target vehicle for collision avoidance; and
    transmit line change information including the changed intersection entry line to the target vehicle.

7. The autonomous driving system of claim 6, wherein the server is further configured to determine a vehicle, which has a relatively low priority, among the detected vehicles as the target vehicle.

8. The autonomous driving system of claim 1, wherein the server is further configured to identify an interfering vehicle, which is entering or coming out of a parking block, and give a highest priority to the interfering vehicle among the plurality of vehicles.

9. An autonomous vehicle driving method including:
obtaining, by a server, driving information on each of a plurality of vehicles entering an intersection area within a parking lot;
generating, by the server, priority information on each of the plurality of vehicles based on the driving information on each of the plurality of vehicles; and
transmitting, by the server, control information including the priority information to each of the plurality of vehicles based on the priority information so that the plurality of vehicles pass through the intersection area,
wherein, when a collision risk due to the plurality of vehicles is detected, the control information includes avoidance control information for causing a first vehicle having a relatively high priority to avoid other vehicles among the plurality of vehicles, and stop control information for causing a second vehicle having a relatively low priority to stop temporarily among the plurality of vehicles,
wherein the generating of the priority information includes, in response to receiving a line change request from a turning vehicle among the plurality of vehicles, giving a highest priority to the turning vehicle, and
wherein the transmitting of the control information includes changing a driving line of the turning vehicle and transmitting line change information including the changed driving line to the turning vehicle.

10. The autonomous vehicle driving method of claim 9, wherein the obtaining of the driving information includes:
transmitting a parking lot map, which includes a plurality of nodes and a plurality of node lines formed by the plurality of nodes, to the plurality of vehicles;
obtaining driving line information including intersection entry lines and intersection exit lines, which are selected by the plurality of vehicles among the plurality of node lines; and
obtaining speed information on each of the plurality of vehicles and entry order information indicating an order of the plurality of vehicles entering the intersection area.

11. The autonomous vehicle driving method of claim 10, wherein the plurality of nodes are generated at positions corresponding to corners of each of parking blocks forming the intersection area, and
wherein each of the plurality of node lines is generated by connecting two among the plurality of nodes with a straight line, and the plurality of node lines are disposed in parallel with each other between the parking blocks.

12. The autonomous vehicle driving method of claim 10, wherein the generating of the priority information includes:
predicting a transit time required to transit an intersection entry line based on the intersection entry line and the speed information on each of the plurality of vehicles; and
determining a priority of each of the plurality of vehicles based on the transit time and the entry order information.

13. The autonomous vehicle driving method of claim 12, wherein the generating of the priority information includes:
comparing the transit times of the plurality of vehicles;
when the transit times of the plurality of vehicles are different, giving a high priority to a vehicle having a shortest transit time among the plurality of vehicles; and
when the transit times of the plurality of vehicles are a same, giving a higher priority to a vehicle entering the intersection area earlier among the plurality of vehicles.

14. The autonomous vehicle driving method of claim 10, wherein the transmitting of the control information includes:
detecting vehicles scheduled to travel in directions facing each other along a same node line;
determining a target vehicle for which a change of a driving line is required among the detected vehicles based on the priority information;
changing an intersection entry line of the target vehicle for collision avoidance; and
transmitting line change information including the changed intersection entry line to the target vehicle.

15. The autonomous vehicle driving method of claim 14, wherein the target vehicle includes a vehicle, which has a relatively low priority, among the detected vehicles.

16. The autonomous vehicle driving method of claim 9, wherein the generating of the priority information includes:
identifying an interfering vehicle which is entering or coming out of a parking block among the plurality of vehicles; and
giving a highest priority to the interfering vehicle.

* * * * *